US 8,401,700 B2

(12) United States Patent
Ihrke et al.

(10) Patent No.: US 8,401,700 B2
(45) Date of Patent: Mar. 19, 2013

(54) ACTUATOR AND ELECTRONICS PACKAGING FOR EXTRINSIC HUMANOID HAND

(75) Inventors: Chris A. Ihrke, Hartland, MI (US);
Lyndon Bridgwater, Houston, TX (US);
Myron A. Diftler, Houston, TX (US);
David M. Reich, Huntsville, AL (US);
Scott R. Askew, Houston, TX (US)

(73) Assignees: GM Global Technology Operations LLC, Detroit, MI (US); The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 698 days.

(21) Appl. No.: 12/564,124

(22) Filed: Sep. 22, 2009

(65) Prior Publication Data
US 2011/0071673 A1 Mar. 24, 2011

(51) Int. Cl.
G06F 19/00 (2006.01)
G05B 15/00 (2006.01)
B25J 17/00 (2006.01)
B25J 5/00 (2006.01)

(52) U.S. Cl. ........ 700/245; 700/258; 700/259; 700/264; 74/490.03; 74/490.06; 318/568.12; 901/1; 901/9; 901/15; 901/28; 901/29; 901/46; 901/47; 901/48; 901/49; 901/50

(58) Field of Classification Search ............ 701/1, 36, 701/245; 74/490.03–490.06; 318/568.12; 700/245, 258, 259, 264; 901/1, 9, 15, 28, 901/29, 46–50
See application file for complete search history.

(56) References Cited

U.S. PATENT DOCUMENTS 4,246,661 A * 1/1981 Pinson ............................ 623/25
4,496,279 A * 1/1985 Langer .......................... 414/735
(Continued)

FOREIGN PATENT DOCUMENTS

JP 2002101695 A 4/2002
JP 2007021611 A 2/2007
(Continued)

OTHER PUBLICATIONS http://robotics.nasa.gov/courses/fall2002/event/oct1/NASA_Robotics_20021001.htm.

Primary Examiner — James P. Trammell
Assistant Examiner — Majdi Alsomiri
(74) Attorney, Agent, or Firm — Quinn Law Group, PLLC

(57) ABSTRACT

The lower arm assembly for a humanoid robot includes an arm support having a first side and a second side, a plurality of wrist actuators mounted to the first side of the arm support, a plurality of finger actuators mounted to the second side of the arm support and a plurality of electronics also located on the first side of the arm support.

17 Claims, 5 Drawing Sheets

U.S. PATENT DOCUMENTS

| | | | |
|---|---|---|---|
| 4,729,253 A * | 3/1988 | Rosheim | 74/490.06 |
| 4,834,761 A * | 5/1989 | Walters | 623/26 |
| 4,921,293 A * | 5/1990 | Ruoff et al. | 294/111 |
| 4,986,723 A * | 1/1991 | Maeda | 414/729 |
| 5,355,743 A * | 10/1994 | Tesar | 74/490.03 |
| 6,244,644 B1 | 6/2001 | Lovchik et al. | |
| 6,817,641 B1 * | 11/2004 | Singleton, Jr. | 294/106 |
| 6,913,627 B2 * | 7/2005 | Matsuda | 623/64 |
| 7,204,168 B2 * | 4/2007 | Najafi et al. | 74/471 XY |
| 7,222,904 B2 * | 5/2007 | Matsuda | 294/111 |
| 2010/0011899 A1 * | 1/2010 | Kim et al. | 74/490.04 |
| 2010/0259057 A1 * | 10/2010 | Madhani | 294/106 |

FOREIGN PATENT DOCUMENTS

| | | |
|---|---|---|
| JP | 2007221940 A | 8/2007 |
| JP | 2009056515 A | 3/2009 |

* cited by examiner

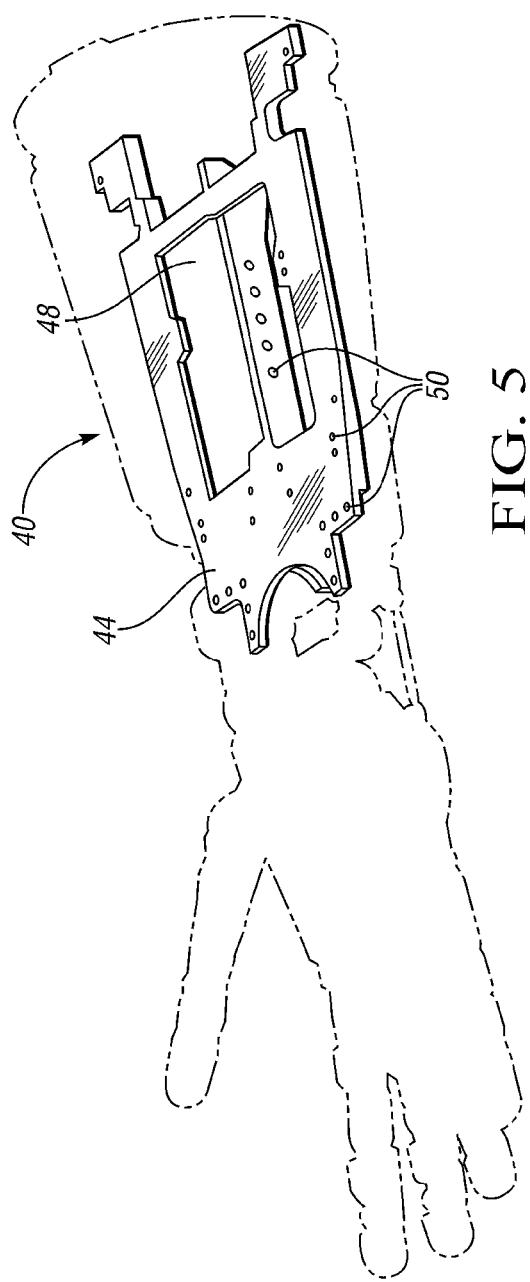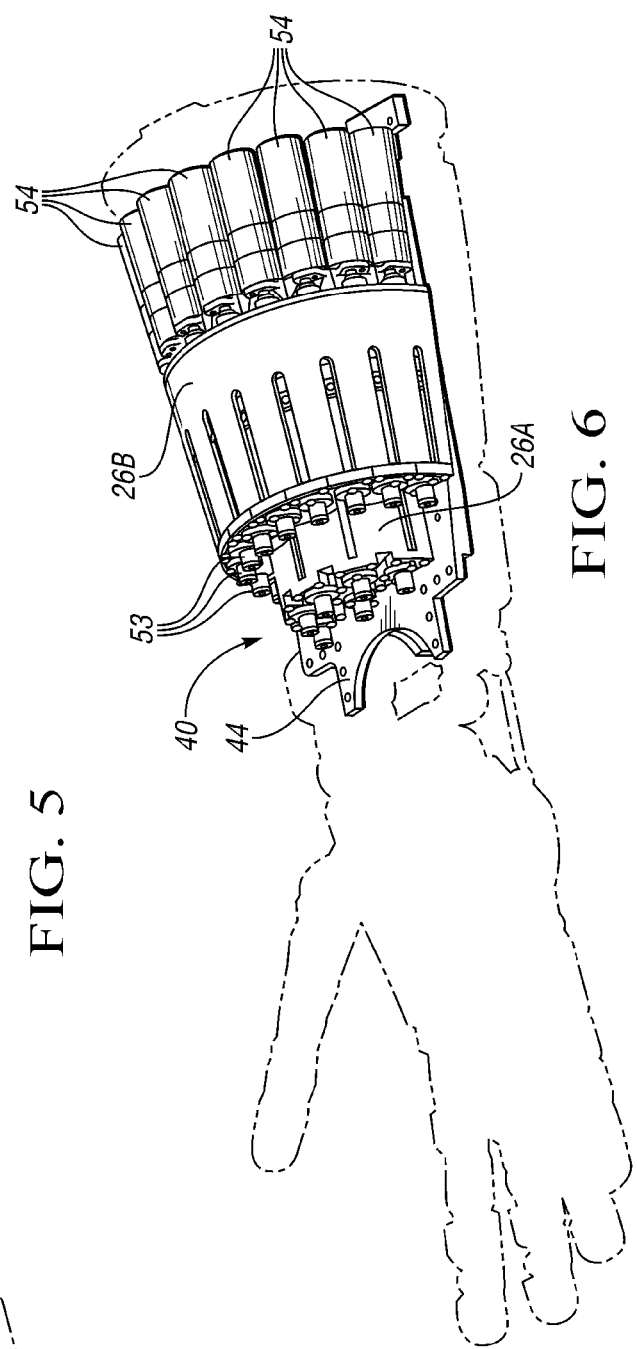

US 8,401,700 B2

ACTUATOR AND ELECTRONICS PACKAGING FOR EXTRINSIC HUMANOID HAND

STATEMENT REGARDING FEDERALLY SPONSORED RESEARCH OR DEVELOPMENT

This invention was made with government support under NASA Space Act Agreement number SAA-AT-07-003. The government may have certain rights in the invention.

TECHNICAL FIELD

The present invention relates to a humanoid robot, and more specifically packaging for the actuation systems for a lower arm of the humanoid robot.

BACKGROUND OF THE INVENTION

Robots are automated devices that are able to manipulate objects using a series of rigid links, which in turn are interconnected via articulations or motor-driven robotic joints. Each joint in a typical robot represents an independent control variable, also referred to as a degree of freedom (DOF). End-effectors are the particular links used for performing a task at hand, e.g., grasping a work tool or an object. Therefore, precise motion control of a robot may be organized by the level of task specification: object level control, i.e., the ability to control the behavior of an object held in a single or cooperative grasp of a robot, end-effector control, and joint level control. Collectively, the various control levels cooperate to achieve the required robotic mobility, dexterity, and work task-related functionality.

Humanoid robots in particular are robots having an approximately human structure or appearance, whether a full body, a torso, and/or an appendage, with the structural complexity of the humanoid robot being largely dependent upon the nature of the work task being performed. The use of humanoid robots may be preferred where direct interaction is required with devices or systems that are specifically made for human use. Due to the wide spectrum of work tasks that may be expected of a humanoid robot, different control modes may be simultaneously required. For example, precise control must be applied within the different spaces noted above, as well control over the applied torque or force, motion, and the various grasp types.

In order to approximate human movement each joint within the robot requires at least one actuator for each DOF. Additionally, these actuators must be packaged in an arrangement that approximately represents human structure and appearance.

SUMMARY OF THE INVENTION

Accordingly, an arrangement is provided herein for packaging of a lower arm assembly for a dexterous humanoid robot. The lower arm assembly for the humanoid robot includes an arm support having a first side and a second side, a plurality of wrist actuators mounted to the first side of the arm support, a plurality of finger actuators mounted to the second side of the arm support, and a plurality of electronics also located on the first side of the arm support.

The plurality of finger actuators includes a first plurality of finger actuators and a second plurality of finger actuators mounted on the second side of the arm support. A support rib is located on the first side of the arm support. One wrist actuator is mounted on each side of the support rib.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 5. is a schematic perspective illustration of a second side of the lower arm support for the dexterous humanoid robot of FIG. 1-4;

FIG. 6 is a schematic perspective illustration of the second side of the lower arm support and a first plurality of finger actuators for the dexterous humanoid robot of FIG. 1-5;

DESCRIPTION OF THE PREFERRED EMBODIMENT

Figure 1:
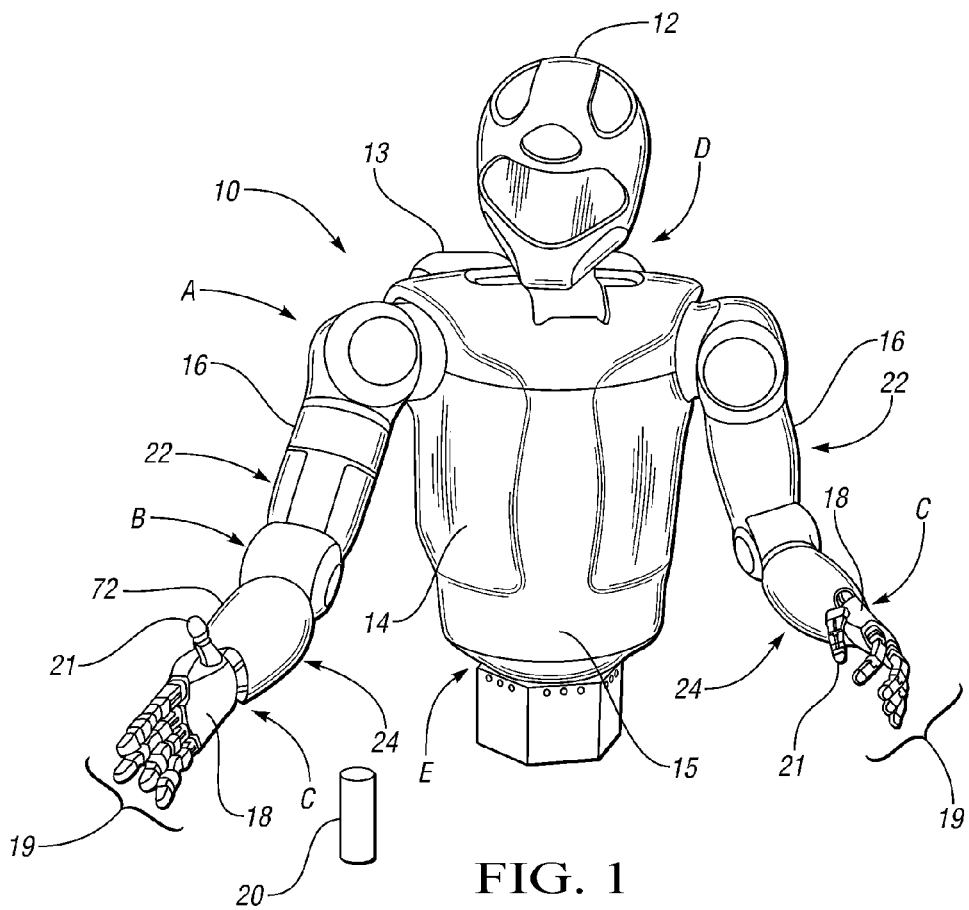
FIG. 1 is a schematic perspective illustration of a dexterous humanoid robot in accordance with the invention.

With reference to the drawings, wherein like reference numbers refer to the same or similar components throughout the several views, FIG. 1 shows a dexterous humanoid robot 10 adapted to perform one or more tasks with multiple degrees of freedom (DOF).

The humanoid robot 10 may include a head 12, torso 14, waist 15, arms 16, hands 18, fingers 19, and thumbs 21, with the various joints being disposed within or therebetween. The robot 10 may also include a task-suitable fixture or base (not shown) such as legs, treads, or another moveable or fixed base depending on the particular application or intended use of the robot. A power supply 13 may be integrally mounted to the robot 10, e.g., a rechargeable battery pack carried or worn on the back of the torso 14 or another suitable energy supply, to provide sufficient electrical energy to the various joints for movement of the same.

According to one embodiment, the robot 10 is configured with a plurality of independently and interdependently-moveable robotic joints, such as but not limited to a shoulder joint assembly (arrow A), an elbow joint assembly (arrow B), a wrist joint assembly (arrow C), a neck joint assembly (arrow D), and a waist joint assembly (arrow E), as well as the various finger joint assemblies (arrow F) positioned between the phalanges of each robotic finger 19.

Each robotic joint may have one or more DOF. For example, certain joints such as the shoulder joint assembly (arrow A) and elbow joint assembly (arrow B) may have at least two DOF in the form of pitch and roll. Likewise, the neck joint assembly (arrow D) may have at least three DOF, while the waist and wrist assemblies (arrows E and C, respectively) may have one or more DOF. Depending on task complexity, the robot 10 may move with over 40 DOF. Although not shown in FIG. 1 for simplicity, each robotic joint contains and is driven by one or more actuators, e.g., joint motors, linear actuators, rotary actuators, and the like.

The arm 16 is divided into an upper arm 22 and a lower arm (or forearm) 24. The upper arm 22 extends from the shoulder joint assembly (arrow A) to the elbow joint assembly (arrow B). Extending from the elbow joint (arrow B) is the lower arm 24, hands 18, fingers 19, and thumbs 21. For the purpose of simplification, as described herein, the upward direction is toward the head 12 and the downward direction is toward the waist 15. Those skilled in the art will appreciate that since the robot 10 is intended to simulate a humanoid, the various extremities—e.g., the arms 16 including upper arms 22, lower arms 24, and hands 18, etc.—will be symmetrical and essentially include an identical symmetrical skeletal structure on both the left and right sides. Therefore, when viewed frontally, as in FIG. 1, the right arm 16 and right hand 18 will actually be on the left of the drawing.

Figure 2:
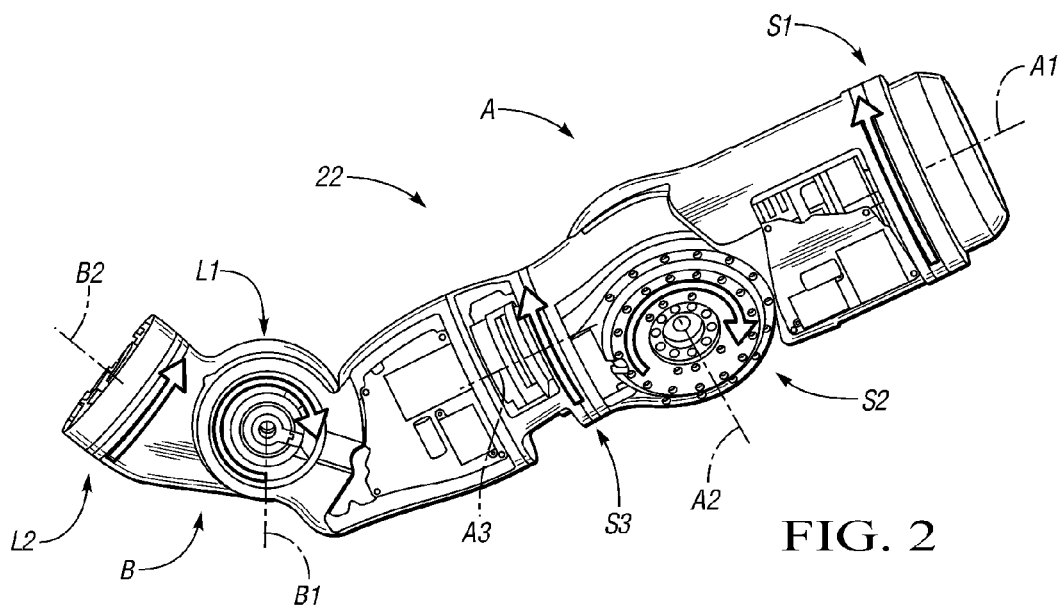
FIG. 2 is a schematic perspective illustration of an upper arm for the dexterous humanoid robot of FIG. 1.

Referring to FIG. 2, the upper arm 22 is illustrated. Although only one upper arm 22 for the arms 16 is shown, both the left and the right arms 16 operate in the same manner as described below. The upper arm 22 has a shoulder joint assembly (arrow A) that includes a first shoulder joint S1 providing a first DOF, and second shoulder joint S2 providing a second DOF, and a third shoulder joint S3 providing a third degree of freedom. Together the first through third shoulder joints S1, S2, S3 perform the movements that represent the movements a human shoulder can perform. Specifically, rotation of the first shoulder joint S1 about a first shoulder axis A1 moves a second shoulder axis A2 for the second shoulder joint S2 into a desired position. Based upon the position of the first shoulder joint S1, rotation of the second shoulder joint S2 about the second shoulder axis A2 then moves the arm 16 up and down relative to the torso 14, or forward and backward relative to the torso 14 or some combination thereof. The third shoulder joint S3 rotates the upper arm 22 about a third shoulder axis A3. Rotation of the third shoulder joint S3 rotates the upper arm 22 axially, i.e. rotation of the third shoulder joint S3 rotates the elbow joint assembly (arrow B) to face upwards or downwards. Therefore, together the first shoulder joint S1, the second shoulder joint S2, and the third shoulder joint S3 perform the motions of a shoulder joint assembly (arrow A).

The upper arm 22 also includes an elbow joint assembly (arrow B), which includes a first elbow joint L1 and a second elbow joint L2. The first elbow joint L1 and the second elbow joint L2 each provide a degree of freedom. Together the first elbow joint L1, and the second elbow joint L2 perform the movements that represent the movements of a human elbow can perform. Rotation of the first elbow joint L1 about a first elbow axis B1 causes the upper arm 22, below the elbow joint assembly (arrow B) to bend and straighten. Additionally, rotation of the second elbow joint L2 about a second elbow axis B2 causes the upper arm 22, below the elbow joint assembly (arrow B) to rotate axially, i.e. rotation of the second elbow joint L2 about the second elbow axis B2 rotates the lower arm 24 and hand 18 (FIG. 1) to face palm up or down.

Figure 3:
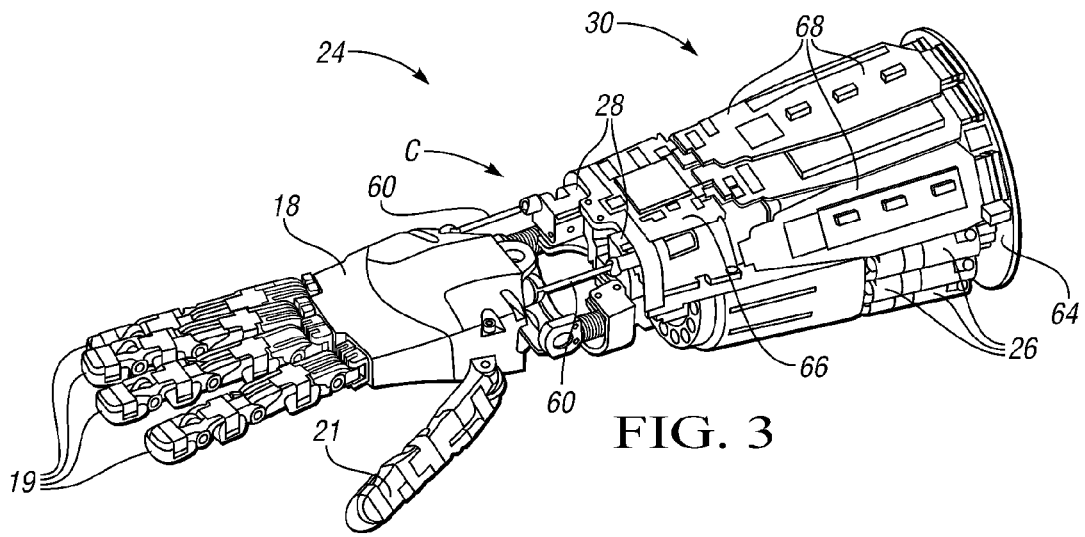
FIG. 3 is a schematic perspective illustration of a lower arm for the dexterous humanoid robot of FIGS. 1 and 2.
Figure 3A:
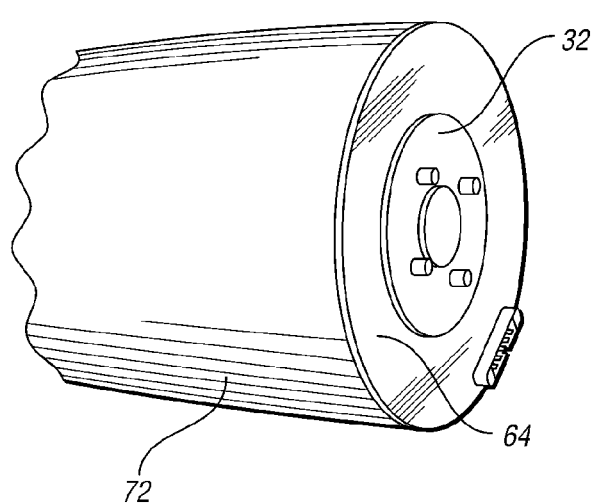
FIG. 3A is another schematic perspective illustration of the lower arm for the dexterous humanoid robot of FIG. 1-3.

FIG. 3 illustrates the lower arm 24, including the wrist joint assembly (arrow C), the hand 18, the fingers 19, and thumb 21. The lower arm 24 includes a plurality of finger (and thumb) actuators 26 and a plurality of wrist actuators 28. Additionally, a plurality of electronics 30 for the finger actuators 26 and the wrist actuators 28 are also supported on the lower arm 24. The lower arm 24 is attached to a load cell 32 (shown in FIG. 3A) which is used to connect the lower arm 24 with the upper arm 22. The load cell 32 allows all loads experienced by the lower arm 24 to be monitored by electronics on the robot 10 which are remote from the lower arm 24.

The finger actuators 26 include the actuators for the thumb 21. Multiple finger actuators 26 may correspond to each finger 19 and the thumb 21. In general, there must be one finger actuator 26 for each DOF available plus one additional finger actuator 26 for each finger 19 or thumb 21. Therefore, each finger 19 having 3 DOF requires four finger actuators 26, each finger 19 having two DOF requires three finger actuators 26, and so on.

The hand 18 includes a thumb 21 having four DOF, two fingers 19 each having three DOF and two fingers 19 each having one DOF (the two fingers 19 each having one DOF share the required one extra finger actuator 26). Additionally, the wrist joint assembly (arrow C) has two DOF. Therefore, the lower arm 22 provides fourteen DOF and requires sixteen finger actuators 26 and two wrist actuators 28. By packaging the finger actuators 26, wrist actuators 28 and the associated electronics 30 within the lower arm 22 this provides a self-contained actuation and control system for the lower arm 24. The lower arm 24 assembly may be assembled as a module and mounted to suitable apparatus, such as the upper arm 22 for the humanoid robot 10.

In the embodiment shown, the lower arm 24 has a hand 18 with a width of 3.6 inches and a length of 7.9 inches. The width of the hand 18 is approximately in the $60^{th}$ percentile size for a human male hand and the length of the hand 18 is approximately in the $80^{th}$ percentile for a human male hand. The wrist joint assembly (arrow C) is 3 inches in diameter. The length of the lower arm 24 to the wrist joint assembly (arrow C) is 9 inches with a maximum diameter of 5 inches and a diameter at the midpoint of 4 inches which is in the $80^{th}$ percentile for a human male forearm. Therefore, the lower arm 24 is of approximate size and appearance as a human forearm.

Figure 4:
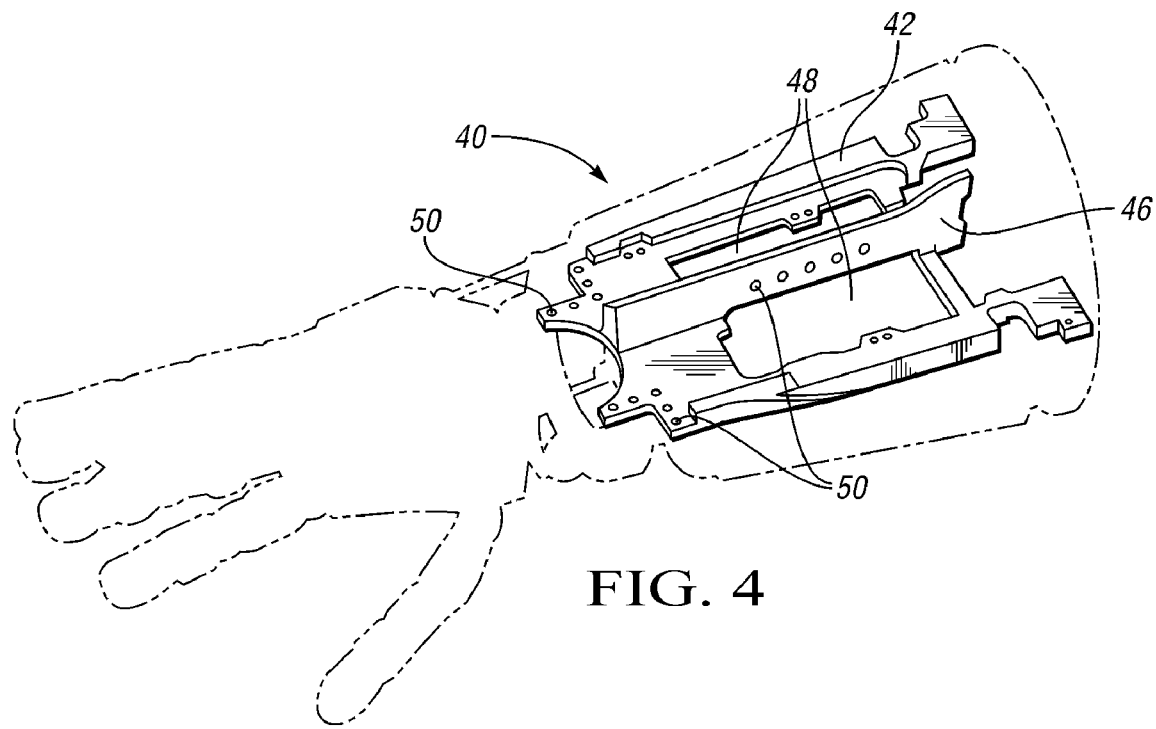
FIG. 4 is a schematic perspective illustration of a first side of a lower arm support for the dexterous humanoid robot of FIG. 1-3B.

FIGS. 4 and 5 illustrate schematic perspective views of a lower arm support 40 for the lower arm 24. The lower arm support 40 is generally planar. FIG. 4 illustrates a first side 42 of the support 40, or dorsal side, which faces upward when the hand 18 is facing palm down and FIG. 5 illustrates a second side 44 of the support 40, or palmer side, which faces upwards when the hand 18 is facing palm up. The support 40 includes a support rib 46 protruding from the first side 42 down the center of the support 40. The support 40 may define a plurality of openings 48 to allow access to components assembled on the support 40 and to reduce the weight of the support 40. Additionally, the support 40 may define a plurality of attachment apertures 50 for attaching various lower arm 24 components to the support 40, as described below.

Figure 6A:
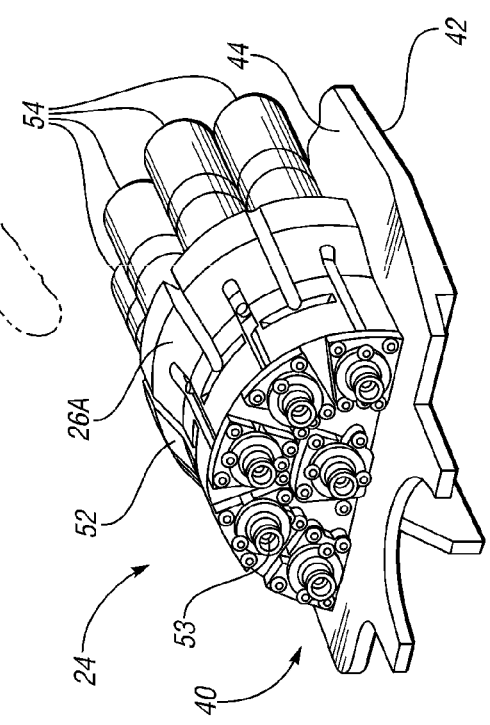
FIG. 6A is a schematic perspective illustration of the second side of the lower arm support and a second plurality of finger actuators for the dexterous humanoid robot of FIG. 1-6.

FIGS. 6 and 6A illustrate the second (palmer) side 44 of the support 40 which a first plurality of finger actuators 26A and a second plurality of finger actuators 26B mounted thereon. The first plurality of finger actuators 26A are assembled within a common housing 52. The housing 52 is mounted onto the second (palmer) side 44 of the support 40. The housing 52 has a generally semi-circular shape with five of the finger actuators 26 packaged in a semi-circle within the housing 52 and one finger actuator 26 packaged at the center of the semi-circle. The second plurality of finger actuators 26B includes an additional ten finger actuators 26. The second plurality of finger actuators 26B are individually housed. The second plurality of finger actuators 26B are individually mounted onto the support 40. For additional strength, support arches (not shown) may be positioned over the first plurality of finger actuators 26A and secured to the support 40. The second plurality of fingers actuators 26B may then be secured to the support arches. The first plurality of finger actuators 26A and the second plurality of finger actuators 26B form a generally semi-circular shape to form the second (palmer) side 44 of the lower arm 24.

Each of the individually housed finger actuators 26 has a housing with a generally trapezoidal cross-section shape to aid in packaging the finger actuators 26 into the generally semi-circular and arched arrangement of the second plurality of finger actuators 26B. Additionally, each of the finger actuators 26 includes a motor 54 secured to one end and a tendon (not shown) attached to the other end 53. The actuators 26 taper inward from the motor 54 to the tendon end 53 of the finger actuator 26. Once assembled the finger actuators 26 create a tapered appearance similar to a human forearm.

Figure 7:
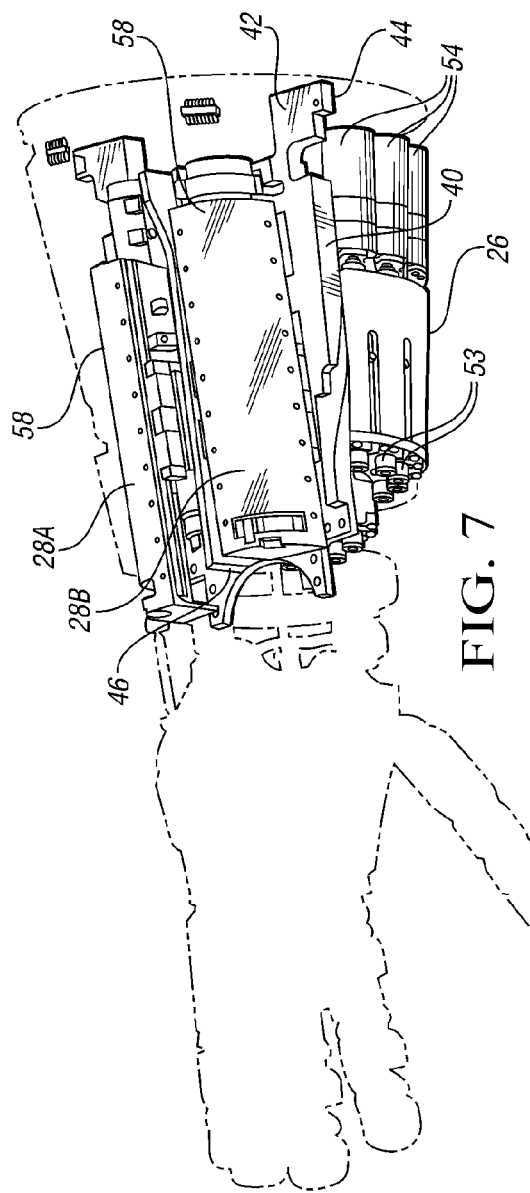
FIG. 7 is a schematic perspective illustration of the first side of the lower arm support and a plurality of wrist actuators and electronics for the dexterous humanoid robot of FIG. 1-6B.

FIG. 7 illustrates the first side (dorsal) 42 of the lower arm 24. A first wrist actuator 28A and a second wrist actuator 28B are mounted on the first side 42 of the support 40. The first and second wrist actuators 28A and 28B are mounted in mirrored relation to one another on opposing sides of the support rib 46.

Figure 8:
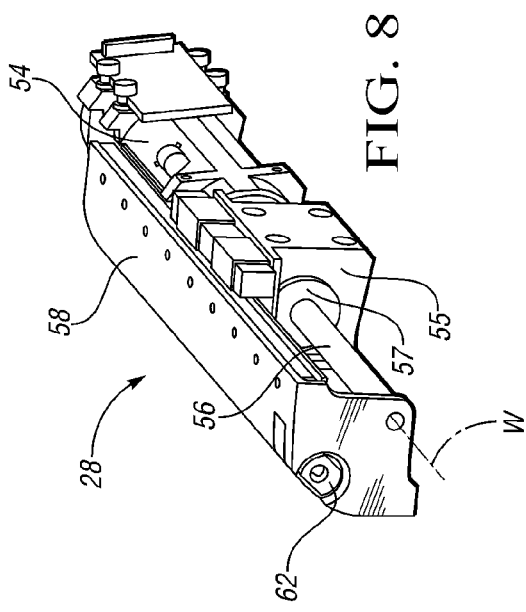
FIG. 8. is a schematic perspective illustration of one wrist actuator for the dexterous humanoid robot of FIG. 1-7.

FIG. 8 illustrates a perspective schematic view of a wrist actuator 28. The wrist actuators 28 each have a slider support 55 which is secured to the first (dorsal) side 42 of the support 40 (shown in FIG. 7). A motor 54 rotates a ball nut 57. The ball nut has a threaded engagement with a ball screw 56, which is connected to a wrist actuator slider 58. The ball nut 57 is rotated by the motor 54 whereas the ball screw 56 is kept from rotating by its connection to the wrist actuator slider 58. The ball screw 56 defines a wrist actuator axis W. As the motor 54 rotates the ball nut 57, the ball screw 56 is translated along a wrist actuator axis W. The axial movement of the ball screw 56 moves the wrist actuator slider 58. A wrist link 60 (shown in FIG. 3) is attached to the slider 58 at a link attachment 62. The wrist link 60 extends from the actuator slider 58 and is attached to the wrist joint assembly (arrow C). As the wrist actuator slider 58 is translated relative to the support 40 the wrist link 60 is also translated to actuate movement of the wrist joint assembly (arrow C).

Figure 3B:
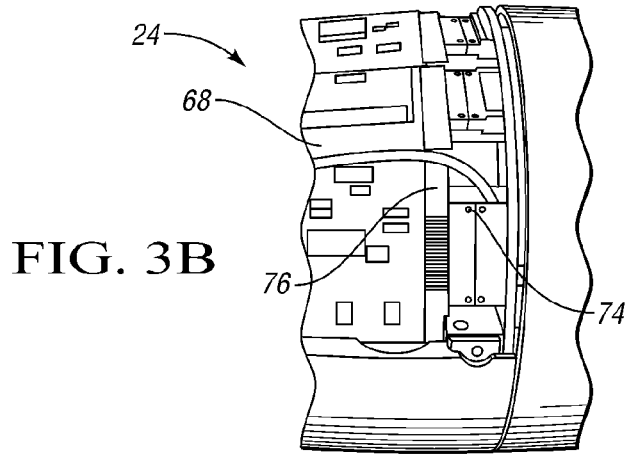
FIG. 3B is an enlarged schematic perspective illustration of a portion of the lower arm for the dexterous humanoid robot of FIG. 1-3A.
Figure 4A:
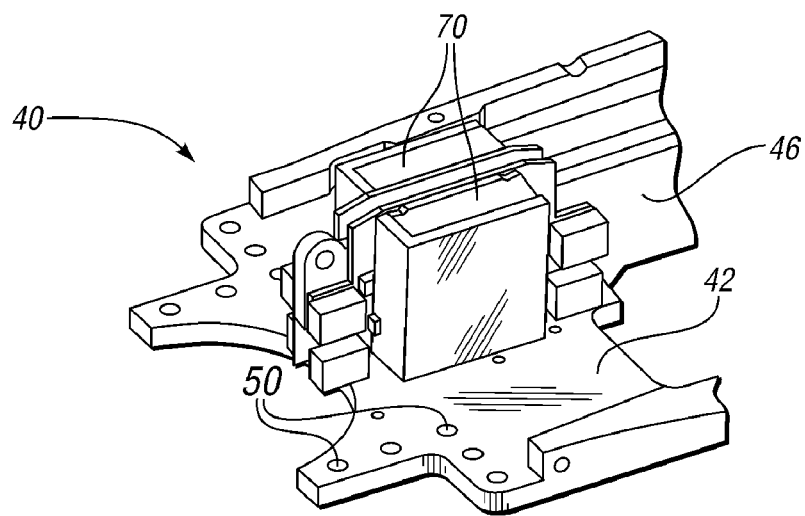
FIG. 4A is an enlarged schematic perspective illustration of the first side of the lower arm support and a plurality of electronics for the dexterous humanoid robot of FIG. 1-4.

Referring back to FIGS. 3-3B and 4A a plurality of electronics 30 are secured to the support 40. In the embodiment shown, the electronics 30 include a ring board 64, a lower arm controller 66, a plurality of motor drivers 68, and a plurality of DC power regulators 70.

The ring board 64 is mounted to the support 40 and concentrically arranged about the load cell 32. The ring board 64 and the load cell 32 have a generally planar arrangement that will allow for necessary wiring while providing for compact packaging of the lower arm 22 to the upper arm 24. The ring board 64 provides the connection circuitry between the finger actuators 26, wrist actuators 28, motor drivers 68, lower arm controller 66, and DC power regulators 70. Additionally, the ring board 64 provides the electrical interface to the remaining portion of the robot 10 in that it accepts motor power, processor power and data communication from the robot 10.

The lower arm controller 66 distributes the motor commands to the motor drivers 68. The motor commands are originated from other controllers associated with the robot 10 and upstream of the lower arm 24.

The motor drivers 68 each perform commutation for the motors 54 in the finger actuators 26 and the wrist actuators 28. The motor drivers 68 each communicate with at least three of the motors 54 for the finger actuators 26 and the wrist actuators 28. There are a total of six motor drivers 68 for controlling all of the finger actuators 26 and the wrist actuators 28 in the lower arm 22. All the required motor drivers 68 are packaged on the lower arm 24. The motor drivers 68 each have a generally trapezoidal shape to allow for tapering of the lower arm 24. The motor drivers 68 are arranged in a generally perpendicular relationship to the ring board 64. Thus, the motor drivers 68 each include a flexible circuit board portion 76 to accommodate the arrangement. The flexible circuit board portion 76 allows the motor drivers 68 to taper inward as they get closer to the wrist, following the generally tapered overall shape of the lower arm 24.

In order to facilitate insertion and extraction of the motor drivers 68, each motor driver 68 includes insertion apertures 74. The insertion apertures 74 are designed for use with common retainer ring pliers. The retainer ring pliers will fit within the insertion apertures 74 to facilitate either insertion or extraction of the motor drivers 68 while preventing damage to the flexible portions 72.

The DC power regulators 70 are mounted on opposing sides of the support rib 46 and provide voltage controlled power to the lower arm controller 66 and to other devices located within the hand 18. The DC power regulators 70 are located between the support rib 46 and the wrist actuators 48. By mounting the power regulators 70 directly to the support rib 46, the support 40 can act as a heat-sink to dissipate the heat generated by the voltage regulators 70.

A lower arm housing 72 (shown in FIG. 1) is mounted to the exterior of the lower arm 22 around the finger actuators 26, wrist actuators 28 and electronics 30. The lower arm housing 72 has a generally circular shape which tapers from the elbow joint assembly (arrow B) to the wrist joint assembly (arrow C). Therefore, the lower arm 24 has a similar appearance to a human forearm.

While the best modes for carrying out the invention have been described in detail, those familiar with the art to which this invention relates will recognize various alternative designs and embodiments for practicing the invention within the scope of the appended claims

The invention claimed is:

1. A lower arm assembly for a humanoid robot comprising:
an arm support having a first side and a second side;
a plurality of wrist actuators mounted to the first side of the arm support;
a plurality of finger actuators mounted to the second side of the arm support;
a plurality of electronics located on the first side of the arm support; and
wherein the plurality of finger actuators includes:
a first plurality of finger actuators assembled within a semi-circular shaped housing and mounted to the second side of the arm support; and
a second plurality of finger actuators arranged in a semi-circular shaped arch and mounted to the second side of the arm support around the first plurality of finger actuators.

2. The lower arm assembly of claim 1, wherein the first side of the arm support includes a support rib and wherein one of the plurality of wrist actuators are mounted on each side of the support rib.

3. The lower arm assembly of claim 2, the plurality of electronics include a ring board, a plurality of motor drivers, a lower arm controller, and a plurality of power regulators.

4. The lower arm assembly of claim 3, wherein one of the plurality of power regulators are mounted on each side of the support rib between the support rib and the respective wrist actuator.

5. The lower arm assembly of claim 3, further including, a plurality of motors, wherein each of the plurality of motors are associated with a respective one of the plurality of finger actuators and wrist actuators, and wherein each of the motor drivers is associated with at least three of the plurality of motors.

6. The lower arm assembly of claim 3, wherein the plurality of finger actuators includes at least sixteen finger actuators.

7. The lower arm assembly of claim 1, further comprising a hand extending from the lower arm, wherein the hand includes a palm side, and wherein the second side of the arm support is associated with a palm side of the hand.

8. A lower arm assembly for a humanoid robot comprising:
an arm support having a first side and a second side;
a plurality of wrist actuators mounted to the first side of the arm support;
a first plurality of finger actuators mounted to the second side of the arm support;
a second plurality of finger actuators mounted to the second side of the arm support around the first plurality of finger actuators;
a plurality of electronics located on the first side of the arm support; and
wherein the first side of the arm support includes a support rib and wherein one of the plurality of wrist actuators is mounted on each side of the support rib.

9. The lower arm assembly of claim 8, the plurality of electronics include a ring board, a plurality of motor drivers, a lower arm controller, and a plurality of power regulators.

10. The lower arm assembly of claim 9, further including, a plurality of motors, wherein each of the plurality of motors are associated with a respective one of the first plurality of finger actuators, the second plurality of finger actuators and the plurality of wrist actuators, and wherein each of the motor drivers is associated with at least three of the plurality of motors.

11. The lower arm for the humanoid robot of claim 10, wherein the first plurality of finger actuators includes at least six finger actuators and the second plurality of wrist actuators includes at least ten wrist actuators.

12. The lower arm for the humanoid robot of claim 1, further comprising a hand extending from the lower arm, wherein the hand includes a palm side, and wherein the second side of the arm support is associated with a palm side of the hand.

13. A lower arm assembly for a humanoid robot comprising:
an arm support having a first side and a second side;
a plurality of wrist actuators mounted to a first side of the arm support;
a plurality of finger actuators mounted to a second side of the arm support;
a support rib located on the first side of the arm support, wherein one of the plurality of wrist actuators are mounted on each side of the support rib; and
a plurality of electronics located on the first side of the arm support.

14. The lower arm assembly of claim 13, wherein the plurality of finger actuators includes:
a first plurality of finger actuators assembled within a semi-circular shaped housing and mounted to the second side of the arm support; and
a second plurality of finger actuators arranged in a semi-circular shaped arch and mounted to the second side of the arm support around the first plurality of finger actuators.

15. The lower arm assembly of claim 13, the plurality of electronics includes a ring board, a plurality of motor drivers, a lower arm controller, and a plurality of power regulators.

16. The lower arm assembly of claim 15, wherein one of the plurality of power regulators is mounted on each side of the support rib between the support rib and the respective wrist actuator.

17. The lower arm assembly of claim 15, further including a plurality of motors, wherein each of the plurality of motors are associated with a respective one of the plurality of finger actuators and wrist actuators, and wherein each of the motor drivers is associated with at least three of the plurality of motors.

* * * * *